Aug. 22, 1967 H. R. IRONS 3,337,745

THIN FILM LOGIC CIRCUITS USING SINGLE TURN COILS

Filed April 2, 1964

INVENTOR.
Henry R. Irons
BY [signature]
ATTORNEY.

United States Patent Office 3,337,745

Patented Aug. 22, 1967

3,337,745
THIN FILM LOGIC CIRCUITS USING SINGLE TURN COILS

Henry R. Irons, Washington, D.C., assignor to the United States of America as represented by the Secretary of the Navy Filed Apr. 2, 1964, Ser. No. 356,993
7 Claims. (Cl. 307—88)

Figures 1, 2, 3:
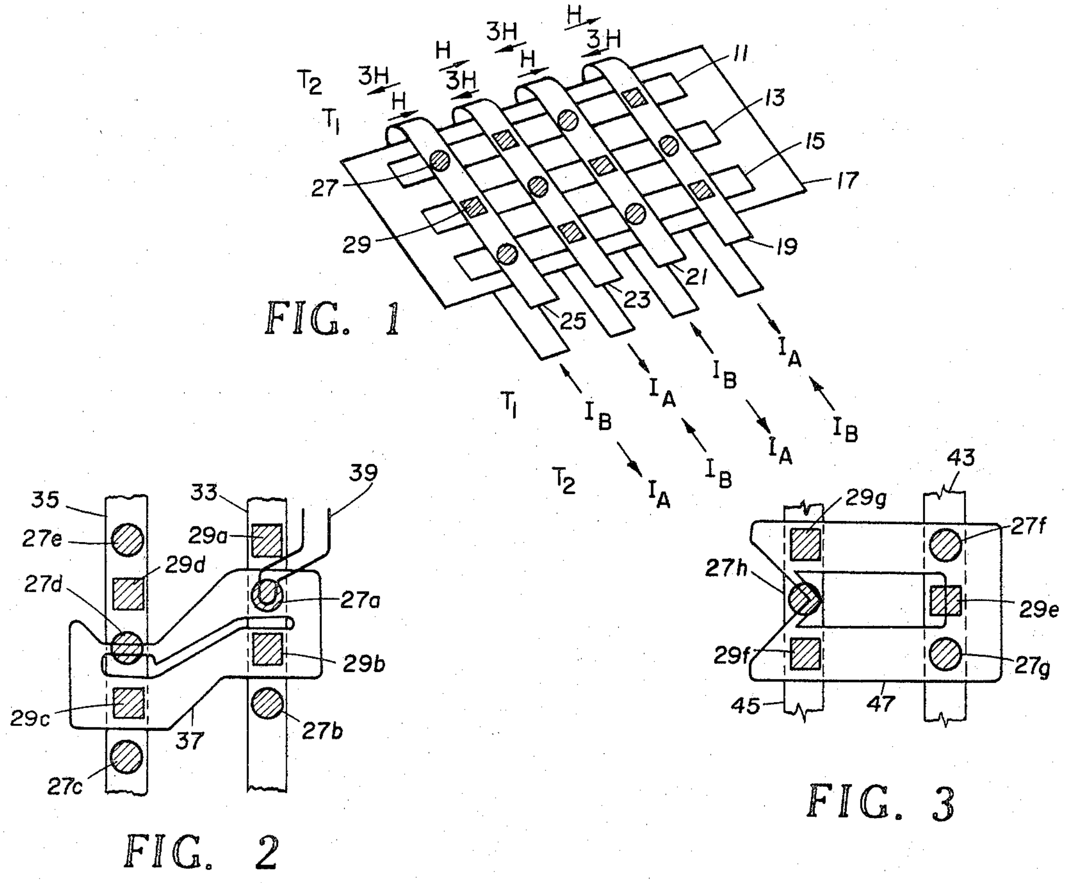

The invention described herein may be manufactured and used by or for the Government of the United States of America for governmental purposes without the payment of any royalties thereon or therefor.

This invention relates to thin magnetic films employed in logic circuits and more particularly to thin magnetic films employed in logic circuits in which single turn closed loop conductors are employed for transferring an information signal from one film to another.

In this invention thin magnetic films disposed in parallel relationship are deposited on glass or metal and placed on a ground plane of conductive material. Rows of flat conductor strips are laid over the thin films, perpendicular to the films in a matrix-like arrangement. The intersections of the thin films and the flat conductors form alternately positioned active regions and buffer regions on the thin films. That is, there will be a buffer region between each active region resulting in a pattern of diagonally aligned active regions and diagonally aligned buffer regions in the overall matrix-like arrangement of thin films and conductors. In addition to the rows, flat conductors crossing the thin films at regularly spaced intervals, single turn loop conductors are disposed between adjacent thin films to provide for transferring signal information from an active region on one film to an active region on an adjacent film. By arranging the loop conductors in various ways, several types of logic functions may be performed, as is hereinafter more fully described.

An object of this invention is to provide a thin film magnetic circuit for performing logic functions.

Another object of this invention is to provide a thin film circuit arrangement in which an information signal may be transferred from one film to another.

A still further object of this invention is to provide a thin film magnetic "Exclusive Or" logic circuit.

Still another object of this invention is to provide a thin film magnetic circuit having active regions for storing signals and buffer regions between said active regions.

Figure 4:
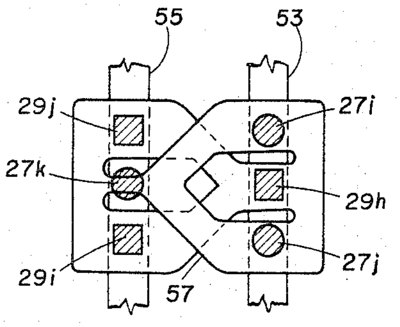

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 of the drawings illustrates a matrix-like arrangement of a thin film magnetic circuit of this invention;

FIG. 2 of the drawings illustrates a transfer circuit of this invention;

FIG. 3 of the drawings illustrates an "Exclusive Or" logic circuit of this invention;

FIG. 4 of the drawings illustrates an "AND" circuit of this invention; and

Figure 5:
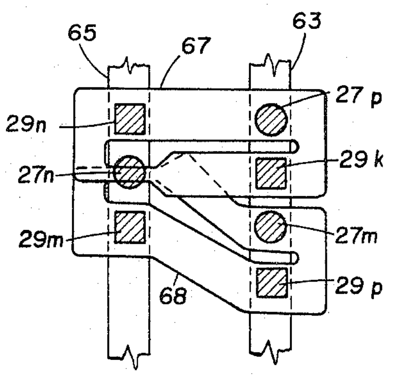

FIG. 5 of the drawings illustrates an "Inhibit" circuit of this invention.

Referring now to FIG. 1 of the drawings a thin film arrangement is illustrated in which thin films 11, 13 and 15 are shown on ground plane 17. Single or multiple turn conductors 19, 21, 23 and 25 are disposed in a perpendicular relationship to thin films 11, 13 and 15. The intersections of the flat conductors with the thin films are provided with either active regions or buffer regions. The active regions 27 are represented by circles and the buffer regions 29 are represented by squares. Signal information is conducted through the system by a conductor which is placed near an active region.

In operation, during a time period $T_1$, a current $I_A$ is applied to conductors 19 and 23, and a current $I_B$ is applied to conductors 21 and 25. During this time period, a magnetizing force of H is applied by conductors 21 and 25, and a magnetizing force of 3H is applied by conductors 19 and 23.

During the time period $T_1$ a signal may be applied to the active regions 27 under conductors 21 and 25 and a readout magnetizing force 3H is applied to active regions 27 under conductors 19 and 23. When the magnetizing force H is applied to the active regions 27 under conductors 21 and 25, a signal applied to one of these regions during this time period will aid the H field applied to nucleate this active region, reversing the polarity of the magnetization. There is then a "1" or a signal stored in this region. During the time period $T_2$, the signal stored in the region 27 will be readout and transferred to another thin film as explained hereinafter. If no signal or a "0" is apapplied to region 27 during time period $T_1$, then there will be no signal appearing at active region 27 during the readout time $T_2$ for conductors 21 and 25. The magnetization direction of the buffer regions is in the direction which corresponds to a "0" in the active regions.

Referring now to FIG. 2 of the drawings, thin films 33 and 35 are shown with a single turn conductor 37 connecting the films. Film 33 is shown having active regions **27*a* and 27*b* and buffer regions 29*a* and 29*b*. Film 35 is shown having active regions 27*c*, 27*d*, 27*e* and buffer regions 29*c* and 29*d*. Conductor 37 connects films 33 and 35 such that an information signal from one film may be transferred to another. That is, conductor 37 is adapted to transfer an information signal from active region 27*a* on film 33 to active region 27*d* on film 35. Conductor 37 covers active region 27*a* and buffer region 29*b* on film 33 and buffer region 29*c* and active region 27*d* on film 35. The portion of conductor 37 in active region 27*d* of film 35 has a reduced width in comparison to the width of the remaining portion of the conductor. In the operation of the transfer circuit of FIG. 2, an information signal may be introduced to active region 27*a* of thin film 33 by conductor 39 during a time period $T_1$ when a magnetizing force H is being applied to active region 27*a* of thin film 33 by a conductor, not shown, which spans films 33 and 35 at active region 27*a* and buffer region 29*d*. In the time period $T_2$, a magnetizing force of 3H will be applied to active region 27*a* of thin film 33. If an information signal is present in conductor 39 during the time interval $T_1$, then there will be a current flow created on conductor 37 at the active region of film 33. This current flow through conductor 37 in the portion of the reduced cross-sectional area will cause a nucleation which results in a reversal of the magnetization of active region 27*d* of film 35. Thus an information signal is transferred from film 33 to film 35**.

The reduction in area in the portion of conductor 37 at active region **27*d* of film 35 increases the effectiveness of the nucleating magnetic field produced around conductor 37 when current is flowing therethrough. The width of the conductor 37 in the active region of film 35 is in the order of 1/10 the normal width of the conductor. It is noted that although conductors such as conductors 19, 21, 23 and 25 are not shown in the logic circuits of FIGS. 2–5, they are part of these circuits. For example, a conductor spans across films 33 and 35, intersecting the films at active region 27*d* and buffer region 29*b***.

Referring now to FIG. 3 of the drawings in which an "Exclusive Or" logic circuit is illustrated, thin films 43 and 45 are connected by a loop conductor 47. Thin film 43 is shown having active regions 27*f*, 27*g*, and buffer region 29*e*. Thin film 45 is shown having active region 27*h* and buffer regions 29*f* and 29*g*. In this circuit a signal will be transferred from film 43 to film 45 if there is a signal applied to either active region 27*f* or active region 27*g* of film 43. However, no signal will be transferred from film 43 to film 45 if either no signal appears at either active region 27*f* or active region 27*g* of film 43, or if a signal appears at both active regions 27*f* and 27*g*.

When no signal appears at either of the active regions 27*f* or 27*g* of film 43 during the time period $T_1$, then there will be no current flow through the loop conductor 47 during the readout time $T_2$. If, however, a signal appears at the active region 27*f* of film 43, for example, then a current will flow through conductor 47 during the readout time, $T_2$. Likewise, if a signal is applied to the active region 27*g* of film 43 during time $T_1$, a current will flow through loop conductor 47. In either case, the current flow through the restricted portion of conductor 47 will cause a nucleation of the magnetic field in active region 27*h* of film 45, reversing the flux thus applying an information signal thereto during the readout time period $T_2$. In the case where signals are applied to both active regions 27*f* and 27*g* of film 43 during time period $T_1$, then current flows will be caused in opposing directions through the loop conductor 47, which will effectively cancel each other, and no information signal will be applied to active region 27*h* of film 45.

Referring now to FIG. 4 of the drawings in which an "AND" logic circuit is illustrated, thin films 53 and 55 are provided with a loop conductor 57 which covers active regions 27*i* and 27*j* and buffer region 29*h* in film 53 and active region 27*k* and buffer regions 29*i* and 29*j* in film 55. The configuration of loop conductor 57 provides for applying an information signal to an active region 27*k* on film 55 if a signal is applied to both of the active regions 27*i* and 27*j* of film 53. This is accomplished by the use of a bucking current applied to the area of active region 27*a* during the time period $T_2$ when the signals are readout of active regions 27*i* and 27*j*. With the bucking current thus applied, it is necessary for a signal to be applied to both active regions 27*i* and 27*j* during the time period $T_2$ as the bucking current balances the current applied by either a signal from active region 27*i* or 27*j* but will be overcome by the current flow from signals applied to both 27*i* and 27*j*.

Referring now to FIG. 5 of the drawings in which an "Inhibit" circuit is illustrated, thin films 63 and 65 are connected by loop conductors 67 and 68. Loop conductor 67 includes active region 27*p* and buffer region 29*k* on film 63 and active region 27*n* and a buffer region 29*n* on film 65. A lower portion of loop conductor 67 overlaps an upper portion of loop conductor 68 particularly in the area of the active region 27*n* of film 65. Loop conductor 68 also covers active region 27*m* and buffer region 29*p* of film 63 as well as buffer region 29*m* and active region 27*n* of film 65.

In operation, a current $I_X$ flowing in loop conductor 67 as a result of an information signal being applied to active region 27*p* of film 65, will cancel the effect of a current, $I_Y$, flowing through loop conductor 68, and thus prevent an information signal from being transferred from film 63 to film 65. For example, suppose a signal is applied to active region 27*p* of film 63 during a time period $T_1$ and a signal is also applied to active region 27*m* of film 65 during a time period $T_1$. When time period $T_2$ occurs, the signals will be readout of active regions 27*p* and 27*m* of film 63. This readout will cause a current flow $I_x$ in loop conductor 67 and a current $I_y$ in loop conductor 68.

In an actual embodiment of the matrix-like arrangement of FIG. 1 of the drawings, the thin films were deposited on a layer of glass having a thickness of .002 inch. The thickness of the thin film was about 2000 angstrom units or about $8\times10^{-6}$ inch. The glass layer was mounted on a ground plane of aluminum. Other metals such as copper may be used for the ground plane.

Obviously many modifications and variations are possible in the light of the above teachings. It is therefore to be understood that within the scope of the appended claims, the invention may be practiced otherwise than as specifically described.

What is claimed is:

1. A thin film magnetic logic circuit comprising
- a matrix arrangement of a plurality of rows of thin films disposed on a ground plane of conductive material and a plurality of columns of flat conductors which intersect the thin films alternately in active regions and buffer regions,
- said thin films being magnetically oriented in a first direction,
- said buffer regions being magnetically oriented in a direction opposite to said first direction whereby magnetic isolation is provided between active regions,
- means applying a current for producing a field in first alternate rows of conductors less than sufficient to nucleate a magnetic field in said thin films intersecting said first alternate rows of said conductors during a first time period,
- means applying a readout current in second alternate rows of conductors during a second time period,
- means for applying a signal to an active region at the intersection of first alternate rows of conductors during said first time period.

2. A thin film magnetic logic circuit comprising a first and second thin film disposed in parallel relationship as a ground plane of conductive material,
- first, second and third conductors disposed in parallel relationship and perpendicular to said thin films, said conductors being substantially in contact with said thin films at intersections, said intersections forming alternate active regions and buffer regions,
- a closed loop flat conductor covering an active region in said first film, a buffer region in said first film, a buffer region in said second film and an active region in said second film,
- means applying a current to said first and third conductors during a first time period which will produce less than a nucleating field in said active region of said first film,
- means for applying a signal to said active region of said first film during said first time period,
- means applying a readout current to the active region of said first film during a second time period whereby a signal stored in said active region may be transferred through the loop conductor to an active region on said second film, said loop conductor having a portion of reduced area in the vicinity of the active region of said second film whereby the current flow in said loop conductor may nucleate the active region of said second film during said second time period.

3. A logic circuit as in claim 2 in which said portion of reduced area is perpendicular to said film.

4. A logic circuit as in claim 2 in which said portion of reduced area is parallel to said film.

5. A thin film magnetic logic circuit comprising,
- first and second thin films of ferromagnetic material deposited substantially on a ground plane of conductive material and in parallel relationship,
- first, second and third flat conductors intersecting said first and second films and perpendicular to said first and second films,
- active regions and buffer regions being formed at alternate intersections of said thin films and said flat conductors,
- a flat loop conductor covering a first active region, a buffer region and a second active region on said first film, and a first buffer region, an active region and a second active region on said second film, said loop conductor having a reduced cross-sectional area in the active region of said second film, means for applying a first signal to the first active region of said first film during a first time period, means for applying a second signal to the second active region of said first film during said first time period, means applying a field to the first and second active regions during said first time period, means applying a readout current to the first and third conductors during a second time period whereby a signal is applied to the active region of said second film if a signal is applied to either the first or second active regions of said first film during said first time period.

6. A thin film magnetic logic circuit comprising, first and second thin magnetic films disposed in parallel relationship and substantially upon a ground plane of conductive material, first, second, and third flat conductors intersecting said first and second films in perpendicular relationship with alternate active regions and buffer regions at alternate intersections, a closed circuit loop conductor connecting a first active region on said first film and a second active region on said first film to an active region on said second film, means for applying a signal to said first active region during a first time period, means for applying a signal to said second active region during said first time period, means applying a readout field to said first and second active regions during a second time period, and means applying a bucking current in the vicinity of the active region of said second thin film during said second time period.

7. A thin film magnetic logic circuit comprising, first and second thin magnetic films disposed in parallel relationship substantially on a ground plane of conductive material, a plurality of flat conductors disposed in parallel and perpendicular to said thin magnetic films, a plurality of active regions formed at alternate intersections of said thin films and said flat conductors, a first loop conductor covering a first of said active regions on said first film and a second of said active regions on said second film, a second loop conductor covering a third of said active regions on said first film and said second active region of said second film, means for applying a signal to the first of said active regions during a first time interval, means for applying a signal to the third of said active regions during a first time interval, means applying a readout flux to the first and third of said active regions during a second time interval, said first and second conductor loops having currents which flow in opposite directions in the area of the second of said active regions whereby a signal applied to the first of said active regions will inhibit the application of a signal to the second of said active regions by a signal applied to a third of said active regions.

References Cited

UNITED STATES PATENTS

| | | | |
|---|---|---|---|
| 3,144,641 | 8/1964 | Raffel | 340—174 |
| 3,196,416 | 7/1965 | Williams | 340—174 |
| 3,218,616 | 11/1965 | Huijer et al. | 340—174 |

BERNARD KONICK, *Primary Examiner.*

S. URYNOWICZ, *Assistant Examiner.*